United States Patent
Weber et al.

(10) Patent No.: US 7,820,936 B2
(45) Date of Patent: Oct. 26, 2010

(54) METHOD AND APPARATUS FOR CONTROLLING AND ADJUSTING THE INTENSITY PROFILE OF A LASER BEAM EMPLOYED IN A LASER WELDER FOR WELDING POLYMERIC AND METALLIC COMPONENTS

(75) Inventors: Jan Weber, Maple Grove, MN (US); Thomas J. Holman, Princeton, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 0 days.

(21) Appl. No.: 10/883,868

(22) Filed: Jul. 2, 2004

(65) Prior Publication Data

US 2006/0000812 A1    Jan. 5, 2006

(51) Int. Cl.
B23K 26/20 (2006.01)
(52) U.S. Cl. ................................. 219/121.64
(58) Field of Classification Search ................................
219/121.61–121.66, 121.83, 121.73, 121.74,
219/121.75, 121.85
See application file for complete search history.

(56) References Cited

U.S. PATENT DOCUMENTS

| | | | |
|---|---|---|---|
| 3,818,176 A * | 6/1974 | Brown | 219/124.5 |
| 3,848,104 A * | 11/1974 | Locke | 219/121.65 |
| 3,862,413 A * | 1/1975 | Brienza | 398/183 |
| 3,957,339 A | 5/1976 | Engel | 350/6 |
| 4,215,324 A * | 7/1980 | Abrams et al. | 359/245 |
| 4,251,305 A | 2/1981 | Becker et al. | 156/86 |
| 4,409,462 A * | 10/1983 | Jahnke | 219/121.14 |
| 4,456,811 A | 6/1984 | Hella et al. | 219/121 LM |
| 4,545,018 A * | 10/1985 | Clements et al. | 700/166 |
| 4,574,180 A * | 3/1986 | Kasner et al. | 219/121.82 |

(Continued)

FOREIGN PATENT DOCUMENTS

EP    0 747 069 A2    6/1996

(Continued)

OTHER PUBLICATIONS

Thorsten Bauer et al., Development of an Industrial Femtosecondlaser Micro-Machining System, n.d., but before date of filing of application, 8 pp.

(Continued)

*Primary Examiner*—Samuel M Heinrich
(74) *Attorney, Agent, or Firm*—Crompton, Seager & Tufte, LLC

(57) ABSTRACT

A method and apparatus is provided for forming a fusion bond between two materials such as two components of a catheter. The method begins by forming a bond site by positioning a portion of a first body with respect to a portion of a second body so that a fusion bond site is formed. A laser beam is generated that has an intensity profile across its width. The laser beam is directed onto at least a portion of the first and second bodies within the bond site so that a fusion zone having an increased temperature is formed. After the laser beam is generated, the intensity profile of the laser beam that is directed onto the bond site is controllably adjusted by an optical element such as a dynamically-adjustable beam shaping element.

50 Claims, 6 Drawing Sheets

U.S. PATENT DOCUMENTS

| | | | |
|---|---|---|---|
| 4,623,776 A | 11/1986 | Buchroeder et al. | 219/121 LG |
| 4,626,652 A * | 12/1986 | Bjork et al. | 219/121.68 |
| 4,636,609 A | 1/1987 | Nakamata | 219/121 LD |
| 4,663,513 A * | 5/1987 | Webber | 219/121.6 |
| 4,682,315 A * | 7/1987 | Uejima | 369/44.24 |
| 4,744,615 A * | 5/1988 | Fan et al. | 385/146 |
| 4,812,861 A | 3/1989 | Sasaki et al. | 396/548 |
| 4,913,142 A | 4/1990 | Kittrell et al. | 606/7 |
| 4,943,278 A | 7/1990 | Euteneuer et al. | 604/96 |
| 4,984,885 A * | 1/1991 | Ortiz, Jr. | 356/153 |
| 5,051,600 A * | 9/1991 | Schuetz et al. | 250/492.3 |
| 5,148,442 A * | 9/1992 | O'Neil et al. | 372/71 |
| 5,187,967 A * | 2/1993 | Singh et al. | 72/340 |
| 5,267,013 A * | 11/1993 | Spence | 356/121 |
| 5,267,959 A | 12/1993 | Forman | 604/103 |
| 5,312,320 A * | 5/1994 | L'Esperance, Jr. | 606/5 |
| 5,336,234 A * | 8/1994 | Vigil et al. | 606/159 |
| 5,339,380 A | 8/1994 | Wysocki et al. | 385/136 |
| 5,340,962 A * | 8/1994 | Schmidt et al. | 219/121.78 |
| 5,438,441 A | 8/1995 | Rockstroh et al. | 359/15 |
| 5,501,759 A | 3/1996 | Forman | 156/272.8 |
| 5,506,702 A | 4/1996 | Simpson | 359/15 |
| 5,539,441 A * | 7/1996 | Appel et al. | 347/134 |
| 5,549,557 A | 8/1996 | Steinke et al. | 604/103 |
| 5,549,632 A * | 8/1996 | Lai | 606/5 |
| 5,552,575 A * | 9/1996 | Doumanidis | 219/124.34 |
| 5,558,788 A * | 9/1996 | Mashburn | 219/121.68 |
| 5,595,670 A * | 1/1997 | Mombo-Caristan | 219/121.64 |
| 5,659,479 A * | 8/1997 | Duley et al. | 700/166 |
| 5,674,415 A * | 10/1997 | Leong et al. | 219/121.83 |
| 5,781,317 A | 7/1998 | Kawazoe et al. | 359/12 |
| 5,821,493 A * | 10/1998 | Beyer et al. | 219/121.46 |
| 5,864,430 A | 1/1999 | Dickey et al. | 359/559 |
| 5,886,313 A | 3/1999 | Krause et al. | 21/121.6 |
| 5,893,959 A | 4/1999 | Muellich | 156/272.8 |
| 5,904,511 A * | 5/1999 | Misawa et al. | 438/154 |
| 5,961,765 A | 10/1999 | Kastenhofer | 156/244.13 |
| 5,984,916 A * | 11/1999 | Lai | 606/11 |
| 5,989,397 A * | 11/1999 | Laube et al. | 204/298.03 |
| 6,056,739 A * | 5/2000 | Klopotek | 606/5 |
| 6,087,619 A * | 7/2000 | Berkmanns et al. | 219/121.63 |
| 6,091,749 A * | 7/2000 | Hoffmaster et al. | 372/38.02 |
| 6,139,525 A | 10/2000 | Davis-Lemessy et al. | 604/103 |
| 6,210,401 B1 * | 4/2001 | Lai | 606/12 |
| 6,211,483 B1 | 4/2001 | Bishop | 219/121.63 |
| 6,215,094 B1 * | 4/2001 | Dausinger et al. | 219/121.62 |
| 6,262,387 B1 * | 7/2001 | Chang | 219/121.63 |
| 6,299,604 B1 | 10/2001 | Ragheb et al. | 604/265 |
| 6,311,099 B1 * | 10/2001 | Jasper et al. | 700/166 |
| 6,399,915 B1 * | 6/2002 | Mori et al. | 219/121.83 |
| 6,420,674 B1 * | 7/2002 | Cole et al. | 219/121.67 |
| 6,423,927 B1 * | 7/2002 | McCulloch | 219/121.66 |
| 6,444,946 B1 | 9/2002 | Korte | 219/121.6 |
| 6,451,152 B1 * | 9/2002 | Holmes et al. | 156/272.8 |
| 6,596,217 B1 | 7/2003 | Davis-Lemessy et al. | 264/400 |
| 6,611,335 B1 * | 8/2003 | Hovde | 356/437 |
| 6,618,174 B2 | 9/2003 | Parker et al. | 359/15 |
| 6,690,515 B2 * | 2/2004 | McCulloch et al. | 359/624 |
| 6,696,008 B2 * | 2/2004 | Brandinger | 264/400 |
| 6,699,279 B2 * | 3/2004 | Stevens et al. | 623/1.15 |
| 6,710,283 B2 * | 3/2004 | Mori et al. | 219/121.64 |
| 6,712,832 B2 | 3/2004 | Shah | 606/192 |
| 6,740,191 B2 | 5/2004 | Clarke et al. | 156/272.8 |
| 6,740,196 B2 * | 5/2004 | Lee et al. | 156/345.27 |
| 6,764,710 B2 * | 7/2004 | Merdan et al. | 427/2.28 |
| 6,791,060 B2 * | 9/2004 | Dunsky et al. | 219/121.7 |
| 6,838,638 B2 * | 1/2005 | Satou et al. | 219/121.73 |
| 6,914,868 B1 * | 7/2005 | Redmond et al. | 369/112.01 |
| 6,953,457 B2 * | 10/2005 | Farr et al. | 606/15 |
| 6,965,624 B2 * | 11/2005 | Albrecht et al. | 372/57 |
| 6,967,777 B2 * | 11/2005 | Hirai | 359/563 |
| 7,009,138 B2 * | 3/2006 | Amako et al. | 219/121.64 |
| 7,046,711 B2 * | 5/2006 | Kopf et al. | 372/57 |
| 7,072,566 B2 * | 7/2006 | Seo et al. | 385/147 |
| 7,156,861 B2 * | 1/2007 | Scribner et al. | 606/192 |
| 7,184,657 B1 * | 2/2007 | Camm et al. | 392/418 |
| 7,190,441 B1 * | 3/2007 | McWhirter et al. | 356/36 |
| 7,429,269 B2 * | 9/2008 | Schwammenthal et al. | 623/2.14 |
| 7,449,659 B2 * | 11/2008 | Kettner-Reich | 219/121.73 |
| 7,602,822 B2 * | 10/2009 | Lizotte et al. | 372/6 |
| 2001/0045690 A1 | 11/2001 | Brandinger | 264/400 |
| 2002/0045811 A1 * | 4/2002 | Kittrell et al. | 600/407 |
| 2002/0139781 A1 | 10/2002 | Milewski et al. | 219/121.6 |
| 2002/0144984 A1 * | 10/2002 | Mori et al. | 219/121.64 |
| 2003/0102291 A1 | 6/2003 | Liu et al. | 219/121.73 |
| 2003/0141002 A1 | 7/2003 | Flanagan | 156/64 |
| 2004/0082090 A1 * | 4/2004 | Hatano et al. | 438/30 |
| 2004/0086542 A1 | 5/2004 | Hossainy et al. | 424/423 |
| 2004/0114662 A1 * | 6/2004 | Messler | 374/130 |
| 2005/0201211 A1 * | 9/2005 | Fujita et al. | 369/13.01 |
| 2005/0205534 A1 * | 9/2005 | Caldwell | 219/121.63 |
| 2006/0166469 A1 * | 7/2006 | Nakayama et al. | 438/487 |
| 2006/0278618 A1 * | 12/2006 | Forrest et al. | 219/121.64 |

FOREIGN PATENT DOCUMENTS

| | | | |
|---|---|---|---|
| EP | 0 923 953 A2 | | 6/1999 |
| EP | 000985922 A1 * | | 3/2000 |
| EP | 1 192 957 A2 | | 4/2002 |
| EP | 1 201 610 A2 | | 5/2002 |
| EP | 1 331 058 A1 | | 7/2003 |
| FR | 2836080 A1 * | | 3/2003 |
| FR | 2 836 080 A1 | | 8/2003 |
| JP | 355096913 A * | | 7/1980 |
| JP | 361144289 A * | | 7/1986 |
| JP | 407195187 A * | | 8/1995 |
| JP | 410085965 A * | | 4/1998 |
| JP | 363273589 A * | | 11/1998 |
| JP | 2004260144 A * | | 9/2004 |
| WO | WO 01/47572 A2 | | 7/2001 |
| WO | WO 2004/026359 A1 | | 4/2004 |
| WO | WO 2006/047191 A1 | | 5/2006 |

OTHER PUBLICATIONS

PCO AG, Kelheim, Germany. Sensicam fast shutter cooled digital 12bit CCD camera system. Product brochure, 6 pp.

Thomas Lippert et al., "Chemical and Spectroscopic Aspects of Polymer Ablation: Special Features and Novel Directions," *Chem. Rev.*, vol. 103, 2003, pp. 453-485.

R.E. Baier, et al., "Surface Properties Determine Bioadhesive Outcomes: Method and Results", *Journal of Biomedical Materials Research*, 1984, vol. 18, pp. 337-355.

Herbert Dardik, et al., Morphologic and Biophysical Assessment of Long Term Human Umbilical Cord Vein Implants Used as Vascular Conduits, *Surgery, Gynecology & Obstetrics*, Jan. 1982, vol. 154, pp. 17-26.

Judit E. Puskas, et al., "Polyisobutylene-Based Biomaterials", *Journal of Polymer Science: Part A: Polymer Chemistry*, vol. 42, 2004, pp. 3091-3109.

* cited by examiner

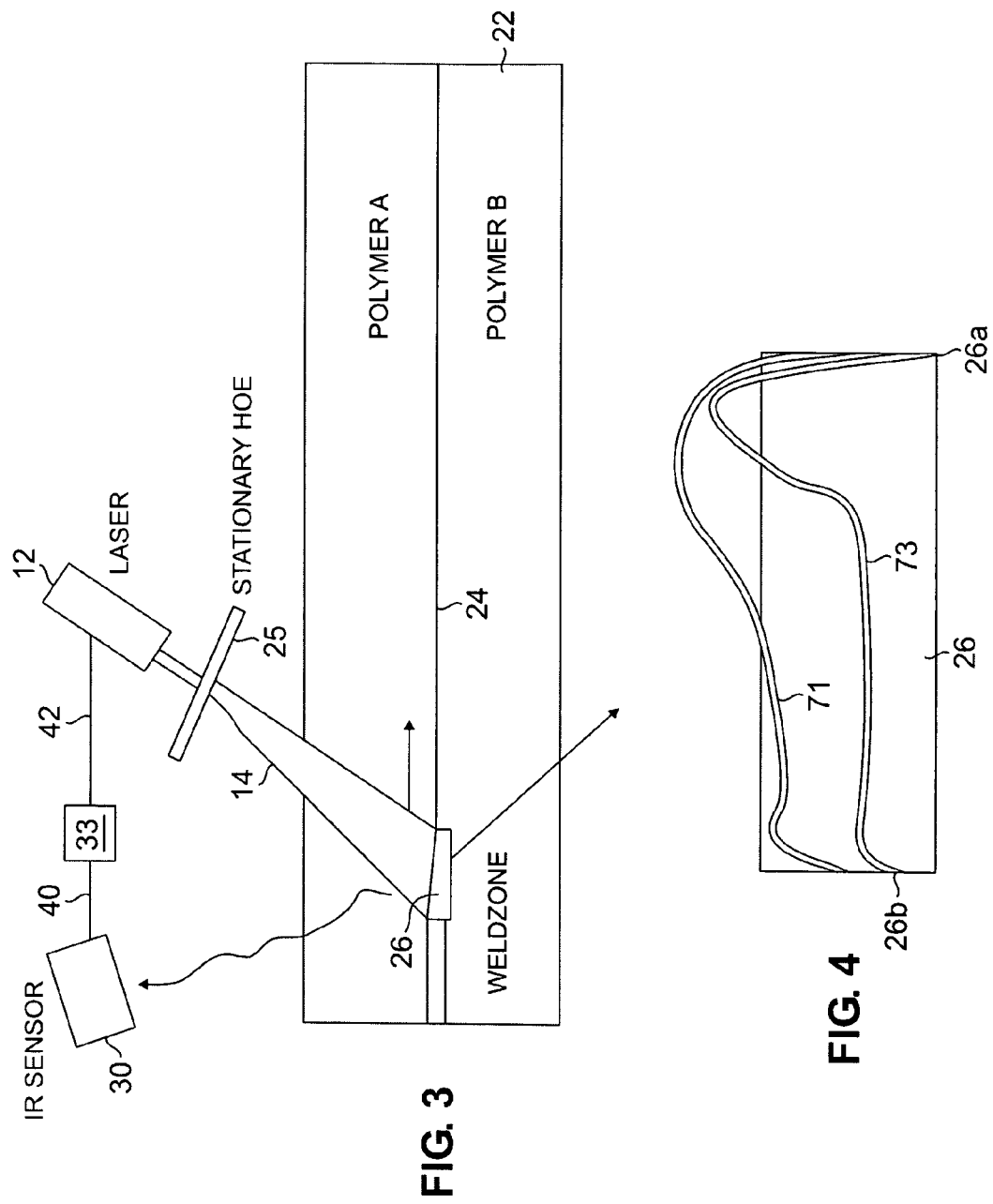

METHOD AND APPARATUS FOR CONTROLLING AND ADJUSTING THE INTENSITY PROFILE OF A LASER BEAM EMPLOYED IN A LASER WELDER FOR WELDING POLYMERIC AND METALLIC COMPONENTS

FIELD OF THE INVENTION

The present invention relates to bonding of catheter components, which catheters are employed in medical procedures such as angioplasty and stent delivery procedures, and more particularly to a weld bonding method and apparatus that utilizes laser energy for effectively welding together polymeric components, such as medical catheter components.

BACKGROUND OF THE INVENTION

Many types of catheters such as balloon catheters, for example, have been developed for treating problems and diseases of body systems including the vascular, pulmonary, lymphatic, urinary, and other body systems that include one or more body lumens. Such catheters advantageously provide treatment by generally minimally-invasive techniques by permitting manipulation of distal features of such catheters from their proximal ends. These catheters may be made up of many components with properties selectively chosen for specific functions. And as a result, it is generally desirable to combine different components to obtain particular control aspects of such catheters. Generally, polymeric materials are used for such catheters because of medical use conditions and sanitation requirements and the like.

Balloons for use with these catheters are frequently prepared from a variety of polymeric materials depending on their intended use. Generally, these materials are required to possess elastomeric properties such that the dilatation balloon has the requisite compliance. That is, the balloon has a predetermined relationship between balloon diameter and inflation pressure. Moreover, such balloons must be able to resist bursting at the relatively high pressures commonly employed during these procedures. Because some catheter component materials typically may not possess elastomeric properties for a particular application, the balloons can be prepared from a polymeric material which is different from, and is not readily bonded to, the material employed to fabricate the catheter.

One technique for bonding dilatation balloons and catheters involves directing laser energy along a fusion bond site. One such laser process is disclosed in U.S. Pat. No. 5,501,759 to Forman. One problem with the laser welding technique disclosed in the aforementioned patent is that it typically utilizes a predetermined static laser power over a short pulse or multiple pulses. As such, the temperature of the polymeric material rises from the beginning of the weld pulse to the end of the weld pulse in a generally linear manner. This can cause the properties of the bonded region to vary undesirably. Moreover, variations in the material contact and seam condition for individual balloon catheters may further lead to variations in the properties of the bonded region. To overcome this problem U.S. application Ser. No. 2003/0141002 employs a detector that senses thermal radiation from the bond region. The thermal radiation is correlated to the temperature of the material at the bond region. The sensed thermal radiation is utilized to provide feedback information to the laser that generates the energy that is transferred to the bond site. While this technique allows the amount of energy provided to the bond site to be dynamically adjusted based on the temperature of the bond region, it suffers from a problem that arises because the catheter and dilatation balloon are not necessarily formed from the same materials.

Accordingly, it would be desirable to provide a method and apparatus for controlling and adjusting the amount of energy that is directed to each material during the welding process.

SUMMARY OF THE INVENTION

In accordance with the present invention, a method and apparatus is provided for forming a fusion bond between two materials. The method begins by forming a bond site by positioning a portion of a first body with respect to a portion of a second body so that a fusion bond site is formed. A laser beam is generated that has an intensity profile across its width. The laser beam is directed onto at least a portion of the first and second bodies within the bond site so that a fusion zone having an increased temperature is formed. After the laser beam is generated, the intensity profile of the laser beam that is directed onto the bond site is controllably adjusted.

In accordance with one aspect of the invention, the intensity profile of the laser beam is controllably adjusted based on a predefined intensity profile sequence.

In accordance with another aspect of the invention, the laser beam is directed to the bond site to provide a controllable emissive power spectrum from the fusion zone. The emissive power spectrum of infrared radiation being emitted from the fusion zone is detected while directing the laser beam onto the bond site. The detected emissive power spectrum of infrared radiation is converted into an analog or digital feedback signal and the intensity profile of the laser beam is controllably adjusted based on the feedback signal to controllably obtain a desired emissive power spectrum of infrared radiation emitted from the fusion zone.

In accordance with another aspect of the invention, at least one of the first and second bodies is a polymeric body.

In accordance with another aspect of the invention, the first and second bodies are both polymeric bodies.

In accordance with another aspect of the invention, at least one of the first and second bodies is a metal body.

In accordance with another aspect of the invention, the first and second bodies are both metal bodies.

In accordance with another aspect of the invention, the power level of the laser beam is controllably adjusted based on the feedback signal to obtain the desired emissive power spectrum.

In accordance with another aspect of the invention, infrared radiation being emitted from the first body and infrared radiation being emitted from the second body is distinguished from one another.

In accordance with another aspect of the invention, the detected emissive power spectrum is associated with a temperature of the fusion zone.

In accordance with another aspect of the invention, the detected emissive power spectrum from the first body is associated with a first temperature of the first body in the fusion zone and the detected emissive power spectrum from the second body is associated with a second temperature of the second body in the fusion zone.

In accordance with another aspect of the invention, the first body is a tubular catheter and the second body is a polymeric dilatation balloon.

In accordance with another aspect of the invention, the laser beam is provided by a $CO_2$ laser.

In accordance with another aspect of the invention, the laser beam is directed so that it impinges on the bond site at an angle between about 45 degrees and about 90 degrees.

In accordance with another aspect of the invention, the laser beam is directed so that it impinges on the bond site at a substantially normal angle of incidence.

In accordance with another aspect of the invention, the emissive power spectrum of infrared radiation being emitted from the fusion zone is detected by at least one radiation detecting device.

In accordance with another aspect of the invention, the emissive power spectrum of infrared radiation being emitted from the fusion zone is detected by first and second radiation detecting devices each detecting infrared radiation from a different one of the bodies in the fusion zone.

In accordance with another aspect of the invention, the radiation detecting device comprises a mercury-cadmium-telluride detector.

In accordance with another aspect of the invention, the radiation detecting device comprises a dual split or split quadrant infrared sensor.

In accordance with another aspect of the invention, the laser energy is directed to the bond site with a mirror.

In accordance with another aspect of the invention, the mirror is a dichroic mirror.

In accordance with another aspect of the invention, a control system is operatively connected to a detector by a signal based connection and to a dynamically-adjustable beam shaping element by a signal based connection.

In accordance with another aspect of the invention, an output signal from the control system is provided to the dynamically-adjustable beam shaping element by using a process control algorithm for controllably adjusting the intensity profile of the laser beam.

In accordance with another aspect of the invention, the process control algorithm is a PID control algorithm.

In accordance with another aspect of the invention, the laser beam is refocused to a predetermined shape and directed to the bond site with first and second mirrors.

In accordance with another aspect of the invention, the refocusing step is performed by a dynamically-adjustable beam shaping element.

In accordance with another aspect of the invention, the intensity profile of the laser beam is controllably adjusted by a dynamically-adjustable beam shaping element.

In accordance with another aspect of the invention, the first mirror is a dichroic mirror and the second mirror is a parabolic mirror.

In accordance with another aspect of the invention, the signal to noise ratio of the detected infrared radiation is improved by optically modulating and amplifying the infrared radiation and filtering out the radiation which is not modulated.

In accordance with another aspect of the invention, the bond site is formed by positioning a portion of a first tubular catheter component with respect to a portion of a second tubular catheter component so that a substantially circular fusion bond site is formed.

In accordance with another aspect of the invention, an apparatus is provided for forming a fusion bond between a component comprising a first material and at least one additional component. The apparatus includes a workpiece support for supporting and positioning the first material with respect to a portion of the additional component so that a fusion bond site is formed. A laser is operatively positioned for directing a laser beam having an intensity profile across its width toward at least a portion of the bond site so as to form a fusion zone having an increased temperature. A dynamically-adjustable beam shaping element is operatively positioned for receiving the laser beam and a control system sends a control signal to the beam-shaping element for adjusting the intensity profile of the laser beam.

BRIEF DESCRIPTION OF THE DRAWINGS

The accompanying drawings, which are incorporated in and constitute a part of this specification, illustrate several aspects of the invention and together with the description of the preferred embodiments, serve to explain the principles of the invention. A brief description of the drawings is as follows:

FIG. 3 is a schematic illustration of another alternative embodiment of the laser welding apparatus in accordance with the present invention;

FIG. 4 is schematic illustration of the fusion zone and the temperature profiles therein arising from a moving laser source in the embodiment of the invention depicted in FIG. 3;

DETAILED DESCRIPTION OF THE INVENTION

Figure 1:
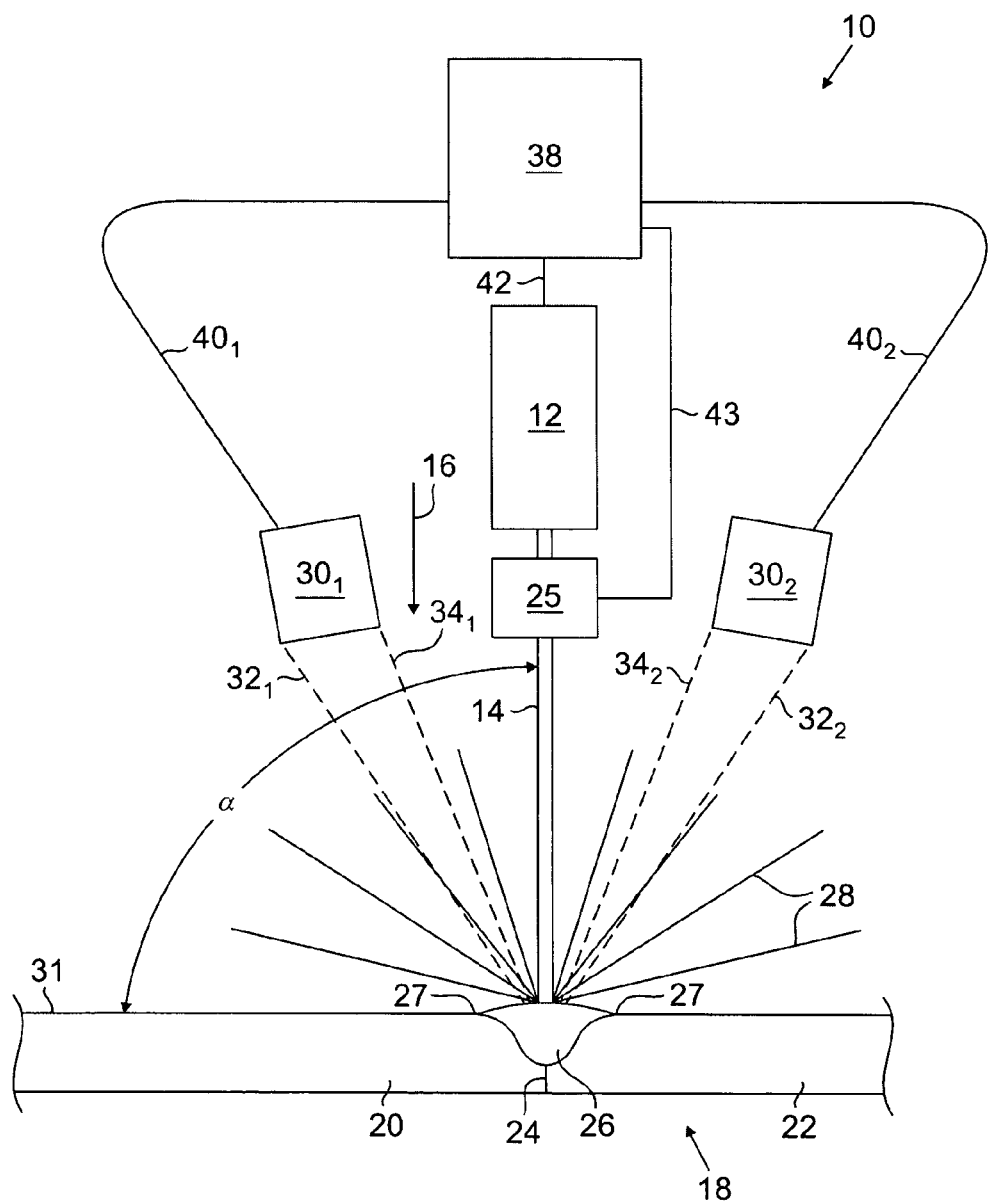
FIG. 1 is a schematic illustration of a laser welding apparatus in accordance with the present invention.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention is directed to methods and apparatuses for effectively bonding components of polymeric materials together, and in particular for bonding components of medical devices, such as catheters. Additionally an aspect of the present invention may be used to bond polymeric materials to non-polymeric materials such as metals, for example, stainless steel as well as other non-polymeric materials such as ceramics and glasses. In particular, the present invention can advantageously provide the ability to bond tubular components of polymeric materials together as are usable for making up components of medical catheters of all types.

Such catheters and components thereof, including balloons and other tubular components such as those defining guidewire and inflation lumens, are commonly formed from materials such as nylons (e.g., nylon 12), thermoplastic polyester elastomers (e.g., Hytrel®), polyethylene terephthalate (PET), polyether-block co-polyamide polymers (e.g., Pebax®), high density polyethylene, polyurethane, other polymers and copolymers, and blends thereof. Guidewire lumens are commonly provided with lubricious materials on their inner surfaces, for example, polytetrafluoroethylene or high density polyethylene, to minimize the friction between the guide wire and the surface of the catheter lumen. As such, techniques are needed to provide bonds between catheter materials and dilatation balloon materials that are consistent, fluid tight, and of sufficient strength to withstand the fluid pressures involved in balloon dilatation without sacrificing important characteristics such as pushability, trackability, crossability, and torque transmission.

In order to achieve a combination of desired properties at different parts of the catheters themselves, catheters have been developed by combining a plurality of tubing components together to define a catheter lumen. That is, a portion of the overall length of a catheter lumen may comprise a different tubing type component than another. These one or more portions may comprise tubing components of different physical characteristics and/or different materials. For example, a tip portion may be provided that is more resilient than the remainder of the catheter lumen for better crossability and to provide a softer leading end of the catheter for abutting body internal membranes and the like. Different materials include different polymeric materials from one another, for example, or similar polymers of different densities, fillers, crosslinking or other characteristics. In particular, a portion of a catheter lumen may comprise a material chosen for flexibility to follow a body lumen's path while another portion may comprise a material chosen for axial and/or torque transmission.

Laser welding of polymeric materials, as known, is an advantageous technique for bonding such polymers, including, in particular the laser welding of catheter components. Lasers, however, are desirably controlled to avoid creating too little or too much heat to get an optimized weld, which is even more difficult when welding plural different polymers. Ideally, during laser welding the different polymers that may form the catheter and the balloon should be brought to temperatures just above their respective melting temperatures (which are in general not equal to one another) and maintained at those temperatures for a period of time to create a mixing layer at the interface. In addition to having different melting temperatures, the two polymers may have different absorption ratios due to fillers, colors, thickness, and the like. Moreover, the polymers may have different crystallizations, which also influences their melting behavior.

Because of their different properties, it can be difficult to maintain the temperature of the two polymers just above their melting temperatures. For example, suppose the absorption of polymer 2 is lower than the absorption for polymer 1, but that the reverse is true for their melting temperatures. In addition, suppose their crystallinities differ as well. Although this example may appear extreme, it is actually quite common. Accordingly, the amount of energy that needs to be applied to bring each polymer to its preferred melting temperature along the interface where they are to be welded will generally be different from one another, and may be referred to as E1 and E2. Since the amount of energy that is needed will change during the melting process E1 and E2 will vary with time and thus may be referred to as E1(t) and E2(t). Compounding the difficulties in providing the proper energy to both polymers, the ratio of E1(t) and E2(t) may not be constant during the welding process and, because of heat flow across the interface between the two polymers, the energy that needs to be delivered to the interface to achieve the appropriate temperatures will be different from the energy that would need to be delivered to bulk portions of the same two polymers. The present invention enhances those welding benefits that are achievable by laser welding by controlling the generation of heat and the temperature of the bond site that each material can be brought to and maintained at their respective appropriate temperatures during the welding process.

As previously mentioned, the amount of energy that needs to be supplied to weld two polymeric materials will in general be different for each material and will also vary with time. While the aforementioned U.S. application Ser. No. 2003/0141002 allows the amount of energy provided to the bond region to be varied in response to the measured temperature of the bond region, it does not allow dynamic adjustment of the amount of energy supplied to each of the different polymeric materials. The present invention allows dynamic adjustment of the amount of energy that is applied across the bond region by a laser beam in response to the temperature that is measured across the bond region.

It is well known that the amount of energy supplied to the bond region by a laser beam is generally not constant across the portion of the bond region on which the laser beam impinges. This is because the irradiance or intensity profile of the laser beam is typically Gaussian, i.e., the beam intensity in a plane normal to the beam is highest at the center or beam waist point and decreases as the distance from the center point increases. Such a distribution is not desirable for various applications where the beam is to be uniformly applied to an area. Accordingly, in order to provide a more uniform energy distribution prior art techniques have employed beam shaping elements for changing a Gaussian intensity profile to a flat intensity profile. Such beam shaping elements take an input laser beam and generate an output laser beam that is the Fourier transform of the optical field of input beam and a phase function. In principle a beam shaper can take an input laser beam having any particular intensity profile and produce an output laser beam having any other intensity profile that is desired.

The present inventors have recognized that a beam shaping element may be used to control the beam intensity applied across the bond region of two polymeric materials so that each material can be brought to and maintained at its desired temperature that is most suitable for forming a bond. That is, rather than using the beam shaper to produce a laser beam with a uniform intensity profile, the present invention uses the beam shaper to produce a laser beam with an intensity profile that is tailored to the different materials to be bonded. Moreover, the beam shaping element can dynamically adjust the intensity profile of the laser beam so that the amount of energy delivered to the different portions of the bond region can be varied in time.

One example of a beam shaping element that may be employed in the present invention is a holographic optical element (HOE). An HOE is an optical component used to modify light rays by diffraction, and is produced by recording an interference pattern of two laser beams and can be used in place of lenses or prisms where diffraction rather than refraction is desired. However, the present invention encompasses other beam shaping elements that can take an input laser beam having any particular intensity profile and produce an output laser beam having any other intensity profile that is desired.

In FIG. 1, a schematic illustration of one embodiment of a welding system 10 for welding polymeric materials in accordance with the present invention is shown. In particular, the welding system 10 that is shown and will be described below is particularly designed for bonding polymeric balloon catheter components and/or plural tubular polymeric catheter components together. However, the welding system 10 may additionally be utilized to bond a polymeric material to a non-polymeric material such as stainless steel. In a welding system 10 according to the present invention, a laser 12 is utilized, which will be described in greater detail below, the purpose of which is to controllably create thermal energy that is needed to weld polymeric components together. In this process, the laser 12 transmits a laser beam 14 in the direction generally indicated by arrow 16. Preferably the laser is a $CO_2$ laser, in which case the wavelength of the laser beam 14 is often about 10.6 microns. $CO_2$ lasers are also available that operate in the 9 micron (e.g., 9.4 and 9.6 microns) region. It is understood that any laser may be used such that the functional aspects of the present invention are accomplished. For example, lasers such as diode lasers having a wavelength between about 400-700 nm and ND:YAG lasers having a wavelength of about 1 micron may be used. It is contemplated that the laser beam 14 may also be directed through optical devices such as lenses and collimators (not shown) for managing the laser beam in accordance with the present invention.

Preferably, laser energy having a wavelength in the far infrared range of about 10.6 microns is used. Generally, polymeric materials used for dilatation balloon catheters are highly absorptive of energy at this wavelength and most of the radiation is absorbed within a few millimeters from the surface. Catheters preferably have wall thicknesses less that about 1 millimeter and thus the polymer catheter is heated by a volumetric absorption of the radiation. As such, it follows that the temperature rise throughout the catheter wall thickness should be substantially uniform. This reduces the heating time required for melting the layer because heat conduction through the polymer is not substantially relied upon, as is the case with prior art hot jaw heating. To the contrary, conduction of heat through a polymer is very slow due to its low thermal conductivity. Using laser energy thus reduces the energy required to form the fusion bond, and substantially prevents any substantial crystallization and hardening of material in either direction from the bond site.

A dynamically-adjustable beam shaping element 25 such as an HOE is located on the optical path between the laser 12 and a workpiece 18. In this way the dynamically-adjustable beam shaping element 25 receives the laser beam from the laser 12 and transforms it so that its intensity profile is better optimized to establish a weld in workpiece 18. In the embodiment of the invention shown in FIG. 1, the laser beam 14 impinges on the workpiece 18 at a substantially normal angle of incidence in order to efficiently utilize the laser beam power. Generally, the angle of incidence α of the laser beam 14 on the workpiece 18 is between 45 degrees and 90 degrees from a surface 31. It is understood that the laser beam 14 may impinge on the workpiece 18 at any angle provided that sufficient thermal energy is created for a specific application taking into account the one or more polymeric materials involved and the type of laser used.

Figure 6:
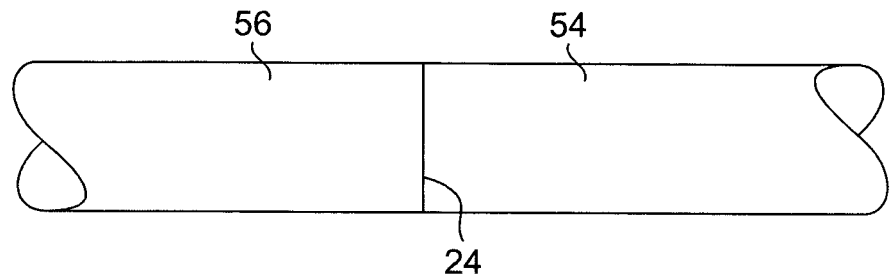
FIG. 6 is an illustration of a first and second catheter positioned to form a fusion bond site.

The workpiece 18 includes a first polymeric body 20 and a second polymeric body 22 positioned, as schematically illustrated in FIG. 1, so that a fusion bond site 24 is formed. The first polymeric body 20 and the second polymeric body 22 may be a tubular component, such as the catheter 58 and dilatation balloon 60 shown in FIG. 7. As illustrated in FIG. 6, the first polymeric body 20 and the second polymeric body 22 may be a first tubular catheter component 54 and a second tubular catheter component 56 where the first tubular catheter component 54 is positioned with respect to the second tubular catheter component 56 to be bonded together at facing ends thereof, thus creating a bond site 24. Such a weld is commonly called a butt weld joint. It is understood that the present invention may be utilized to create other weld techniques, such as lap welds and any other known or developed welding technique whereby components are located with at least portions thereof adjacent one another. And additionally, as described above such components may comprise both polymeric and non-polymeric components. Any such components are represented by the first and second polymeric bodies 20 and 22 respectively.

Preferably, the laser beam 14 impinges on the workpiece 18 at the fusion bond site 24 or at least close enough to it so that it can be effectively heated for forming at least a partial fusion bond. As described below, the impingement of the laser beam 14 on the workpiece 18 creates a fusion zone 26 having a generally increased temperature. Also as described below, the fusion zone 26 emits infrared radiation 28 as illustrated in FIG. 1. Generally, the fusion zone 26 corresponds to the region directly heated by the laser beam 14. As such, the fusion zone 26 may be generally circular, elliptical, rectangular, line-shaped, or annular or any combination thereof.

The intensity profile of laser beam 14 that impinges on the fusion zone 26 may be controllably adjusted in a variety of different ways. For example, in some embodiments of the invention the beam shaping element 25 may be provided with a predefined sequence of configurations that are used to achieve a predefined sequence of intensity profiles. In other embodiments of the invention, some of which are detailed below, a feedback mechanism may be employed to adjust the intensity profile of the laser beam based on the temperature of the fusion zone 26 as the laser beam impinges on it.

In FIG. 1 the welding system 10 is shown to include a feedback arrangement that employs first and second infrared radiation detectors or sensors $30_1$ and $30_2$, the purpose of which, in accordance with one aspect of the present invention, is to directly detect the thermal radiation being emitted by respective ones of the polymeric bodies 20 and 22 in the fusion zone 26 of the fusion bond site 24 to provide feedback to the laser 12 to control the output of the laser beam 14 and/or the configuration of the HOE 25. That is, the first detector $30_1$ is arranged to detect thermal radiation from the first polymeric body 20 in the fusion zone 26 and the second detector $30_2$ is arranged to detect thermal radiation from the second polymeric body 22 in the fusion zone 26. In another aspect of the present invention, the sensed thermal radiation 28 is correlated to the temperature of the fusion zone 26. In other words, the first and second detectors $30_1$ and $30_2$ should sense the temperature of the first and second polymeric materials 20 and 22, respectively, in the fusion zone 26 as opposed to the temperature of the materials adjacent to the fusion zone 26 (as indicated by reference numeral 27 in FIGS. 1 and 2) because the actual fusion of the materials takes place at the fusion zone 26 where the materials are molten or softened such that a fusion bond may be formed. In this way it is possible to get an accurate temperature reading directly from each material in the fusion zone 26 as opposed to those closely affected adjacent material zones. It is noted that the fusion zone 26 may comprise the entire bond site 24 or may comprise a portion of the bond site 24.

The detectors $30_1$ and $30_2$ may each comprise an infrared detector or pyrometer that senses thermal radiation that emanates from the fusion zone 26 of the bond site 24 during the weld bonding process. As described in more detail below, any infrared detector is suitable for use in accordance with the present invention, but it is preferable that an infrared detector be selected that is sensitive to infrared readings as they are emanated from polymeric materials at around their melting temperatures. For specific polymeric materials and desired weld bonding applications, different detection criteria may be used.

Preferably, the first detector $30_1$ is positioned so that it may receive thermal radiation 28 that is emitted from the first polymeric material 20 in fusion zone 26. The detector $30_1$ generally has a particular field of view such as illustrated by dashed line $32_1$ and dashed line $34_1$ in FIG. 1. As illustrated in FIG. 1, the detector $30_1$ is positioned generally above the bond site 24 and to a side of the laser beam 14. Such an arrangement is generally referred to as an off axis arrangement because the detector $30_1$ is positioned on an axis different from that of the laser beam 14.

Likewise, the second detector $30_2$ is positioned so that it may receive thermal radiation 28 that is emitted from the second polymeric material 22 in fusion zone 26. The detector $30_2$ generally has a particular field of view such as illustrated by dashed line $32_2$ and dashed line $34_2$ in FIGS. 1 and 2. As illustrated in FIG. 1, the second detector $30_2$ is positioned generally above the bond site 24 and to the side of the laser beam 14 opposite to the side on which the first detector $30_1$ is located.

Figure 2:
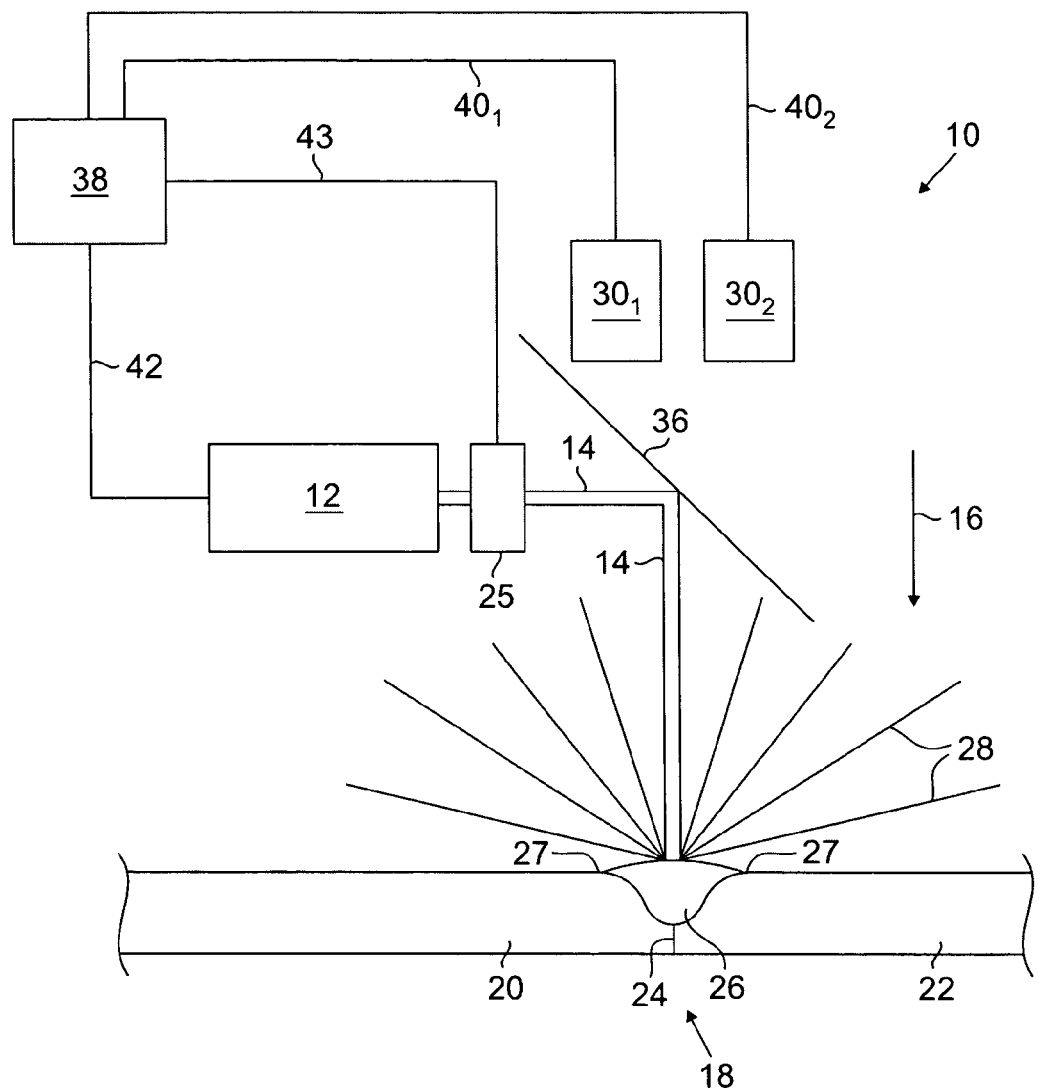
FIG. 2 is a schematic illustration of one alternative embodiment of the laser welding apparatus in accordance with the present invention.

In FIG. 2, a variation of the welding system 10 of FIG. 1 is illustrated. In FIG. 2, an on axis arrangement of the detectors $30_1$ and $30_2$ is shown. In the on axis configuration, the welding system 10 preferably also includes a mirror 36 for diverting the laser beam 14 so that the detectors $30_1$ and $30_2$ may be positioned on axis with a portion of the laser beam 38 that is directed to the bond site 24. Preferably, the mirror 36 is positioned such that the laser beam 38 impinges the workpiece 18 at a generally normal angle of incidence. As above, other angular relationships are contemplated provided sufficient thermal energy is created to make at least a partial fusion bond. In a preferred embodiment, the mirror 36 is a dichroic mirror capable of diverting a sufficient percentage (preferably substantially all) of the laser beam 14 while simultaneously transmitting a sufficient percentage of infrared radiation 28 through the mirror 36 to the detector $30_1$ and $30_2$. Alternatively, a dichroic mirror capable of diverting the infrared radiation 28 while simultaneously transmitting the laser beam 14 through the mirror 36 to the detector $30_1$ and $30_2$ may be used. It is contemplated that any mirror, beamsplitter, bandpass filter, or arrangement thereof may be used such that the functional aspects of the present invention are realized.

In some embodiments of the invention, the detectors $30_1$ and $30_2$ are high-sensitivity detectors capable of measuring thermal emissions from polymeric materials at typical welding temperatures. CCD camera systems and mercury-cadmium-telluride (HgCdTe or MCT) detectors are commercially available for measuring objects in accordance with the present invention such as polymers, at temperatures between 400 K and 600 K (150° C. to 300° C.). Generally, an MCT detector is capable of measuring temperatures between 200 degrees Kelvin down to cryogenic temperatures of 77 Kelvin or lower. As such, cooling may be utilized to reduce the thermal signature (the infrared emissions) of the detectors $30_1$ and $30_2$ themselves. That is, because the detectors $30_1$ and $30_2$ may be at temperatures near the temperature of the objects being measured, substantial noise in the measurement signal may result because of radiation being emitted from the detectors themselves and their immediate surroundings. The cooling means can be any suitable cooling system such as liquid nitrogen, electronic cooling using a Peltier element, Stirling cooling using a compressor, pulse-tube cooling, and J-T (Joule-Thomson) cooling using adiabatic expansion, etc.. To perform cryogenic cooling, the use of liquid nitrogen or other cryogenic fluid, Stirling cooling, or pulse-tube cooling is desirable. It is contemplated that a detector such as a bolometer, which detects infrared emission as heat, requires no cooling and may be used provided that the system generates intense signals or the detector has high sensitivity.

For welding polymer catheter materials, a preferred wavelength range for the detectors $30_1$ and $30_2$ is from approximately 2 microns to 4 microns. However, greater, smaller or different wavelength ranges are contemplated based upon the materials to be fusion bonded and/or the development of other sensor technology. As is well known, the intensity of infrared radiation being emitted from a material at a particular wavelength depends on the temperature of the material and the emissivity of the material at that wavelength.

While the embodiment of the invention depicted in FIGS. 1 and 2 employ two infrared detectors $30_1$ and $30_2$, in some cases only a single infrared detector may be employed to monitor the entire fusion zone 26. For example, if a CCD camera is employed, it should have sufficient spatial detail to determine the location from which the thermal energy is emitted.

Polymeric materials that may be used for balloon catheters include, as examples and not as a limitation on the invention, high density polyethylene (HDPE), Polyamides, the Polyetheramide copolymer family, HDPE with and without compatibilizers, low density polyethylene (LDPE), LDPE with and without compatibilizers, linear low density polyethylene (LLDPE), LLDPE with and without compatibilizers, polyethylene copolymers such as ethylene vinyl acetate copolymer (EVA) and other vinyl acetates, urethanes, polybutylene terephthalate (PBT), thermoplastic elastomers, isonomers, ethylene acrylic acid polymers, polyether block amide, and ethylene acrylic acid copolymer (EAA), polyurethane, polyesters such as polyethylene terephthalate (PET), polybutylene terephthalate (PBT), copolyesters such as Hytrel, other thermoplastic elastomers such as thermoplastic polyolefin (TPO), styrenic thermoplastic elastomers such as C-Flex, and ionomers such as Surlyn and any combination thereof.

Further referring to FIGS. 1 and 2, the welding system 10 preferably includes a control system 38 operatively connected to the detectors $30_1$ and $30_2$ by signal based connections 401 and 402 for controllably adjusting the configuration of the HOE 25 and possibly the power of the laser beam 14 in response to the infrared radiation 28 emitted from the fusion zone 26. Preferably, the control system 38 is also connected to the laser 12 by a signal based connection 42 and to dynamically-adjustable beam shaping element 25 by signal based connection 43. The control system 38 may include a computer or any processor and may further include software for providing a user interface and for providing a generally configurable system.

The processing system 38 utilizes a control algorithm for providing an output signal for controllably adjusting the configuration of dynamically-adjustable beam shaping element 25 (and possibly the power of the laser beam 14) in response to input signals from the detector $30_1$ and $30_2$. In particular, based on the current measured temperatures of the first and second polymer materials 20 and 22 as well as their desired or target temperatures, the processing system 38 calculates the amount of energy that needs to be supplied to each of the two materials in the fusion zone 26. The processing system 38 then in turn adjusts the configuration (i.e., the diffraction pattern in the case where the beam shaping element is an HOE) of the beam shaping element 25 so that the intensity profile of the laser beam 14 directed to the fusion zone 26 provides the appropriate amount of energy to each of the polymer materials 20 and 22 to adjust their temperatures as necessary to achieve or maintain their respective desired temperatures.

In some embodiments of the invention the desired intensity profile of the laser beam 14 is achieved by exclusively adjusting the configuration of the beam shaping element 25 while the power generated by the laser 12 is held constant. In other embodiments of the invention the processing system 38 calculates the total amount of energy that must be provided to both polymeric materials 20 and 22 and adjusts the laser 12 to produce this power level while adjusting the configuration of the beam shaping element 25 to properly distribute the power over the fusion zone 26. In the former case the beam shaping element 25 may be required to eliminate any excess power generated by the laser 12 that is not needed. One advantage of the latter case, however, is that by adjusting the power output from the laser 12 the configuration of the beam shaping element 25 may only need to be changed on a less frequent basis, thereby reducing the processing power required since changing the configuration of laser 12 is more process intensive than calculating the appropriate adjustment to the laser output power, which only has a single process variable.

The process control algorithm employed by processing system 38 may be any appropriate type of feedback control such as a Proportional, Integral, Differential (PID) control. Such process control algorithms are well known to those of ordinary skill in art and thus will not be discussed in further detail.

FIG. 3 shows another embodiment of the welding system in accordance with present invention in which the laser 12 moves, typically at a constant speed, along a bond site 24 defined between first and second polymeric bodies 20 and 22. In this particular example the bond site 24 defines a seam that extends along the interface between the two bodies 20 and 22. Of course, the bond site 24 need not necessarily define a linear seam as indicated in FIG. 3, but more generally may extend in two or even three dimensions.

While the laser 12 in FIG. 3 moves along the bond site 24, the beam shaping element 25 remains stationary. Similar to the embodiments of the invention shown in FIGS. 1 and 2, the beam shaping element 25 is configured to control and adjust the intensity profile of the laser beam 14 along the fusion zone 26. In this way the intensity profile of the laser beam 14 can be adjusted to achieve the optimal temperature variations over time for each spot or location in the fusion zone 26 to achieve a high quality weld. For example, it is generally desirable to initially ramp up the temperature of any given spot in the fusion zone 26 at a rapid rate to achieve the desired temperature and to then maintain the given spot at the desired temperature for a period of time. This temperature variation can be achieved by initially providing the given spot with a relatively high energy intensity to achieve the rapid temperature rise, followed by a reduction in the intensity to maintain the temperature.

Assuming that the laser beam 14 moves across the bond site 24 in FIG. 3 from left to right, the intensity profile of the laser beam 14 across the fusion zone 26 may be adjusted as shown in FIG. 4. In FIG. 4 the intensity profile most appropriate for each polymer material (e.g., curve 71 for polymer body 20 and curve 73 for polymer body 22) is shown along the vertical axis. In each case the energy applied to a given spot is initially relatively high as the laser 12 first moves across it. As the laser beam 14 continues its motion the given spot moves further into the fusion zone 26 and the energy applied to the spot is decreased to maintain it at about a constant temperature. Accordingly, the intensity profile of the laser beam 14 exhibits an initially rapid rise at the front end 26a of the fusion zone 26 (which is defined with respect to the direction of motion of the laser beam 14) and exhibits a lower plateau in the middle and back end 26b of the fusion zone 26.

Infrared detector 30 in FIG. 3 senses thermal radiation emitted from the fusion zone 26. The thermal radiation may be correlated with an average temperature in the fusion zone 26, which may be used to adjust the configuration of the HOE 25 in the aforementioned manner.

Figure 5:
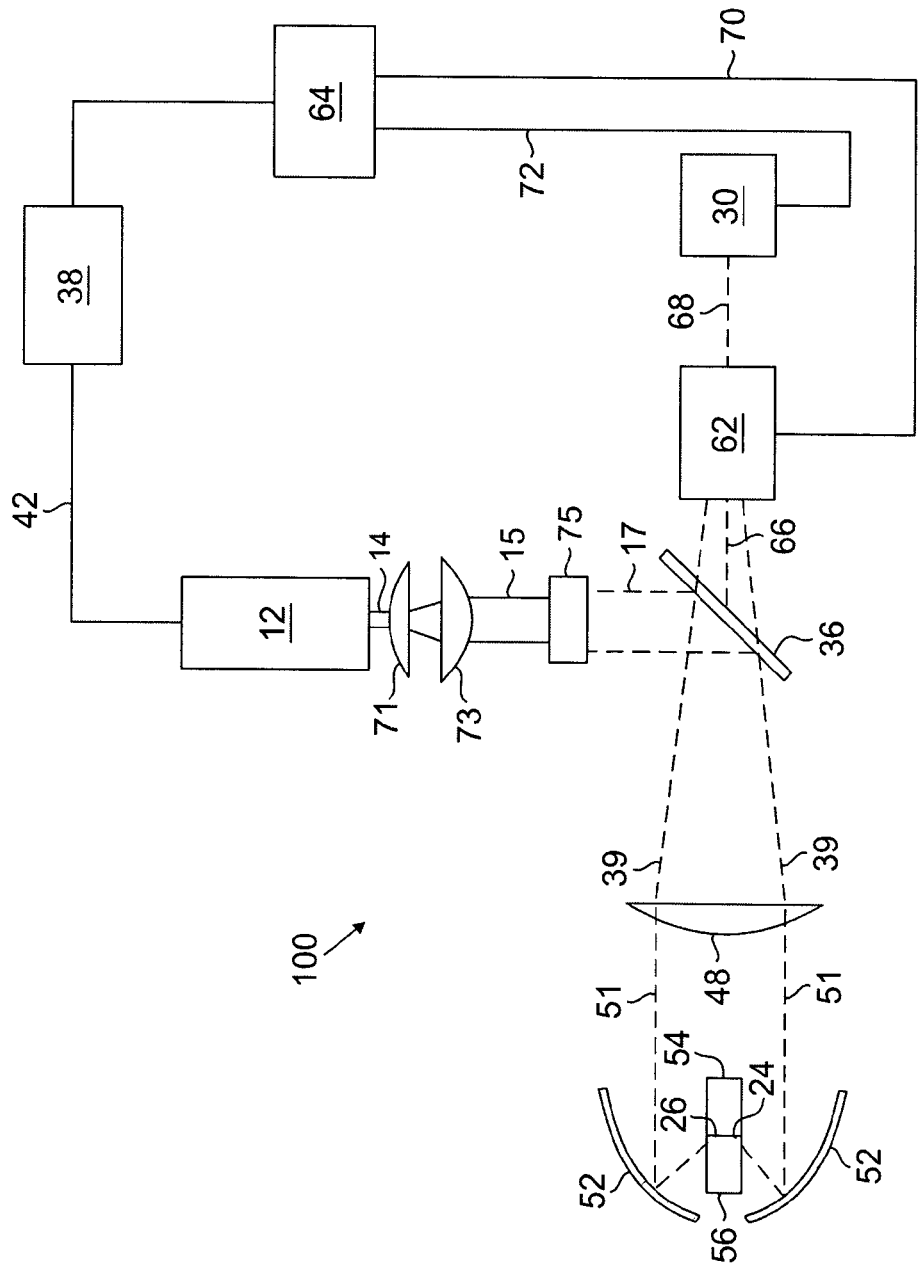
FIG. 5 is a schematic illustration of another alternative arrangement of a laser welding apparatus in accordance with the present invention.
Figure 7:
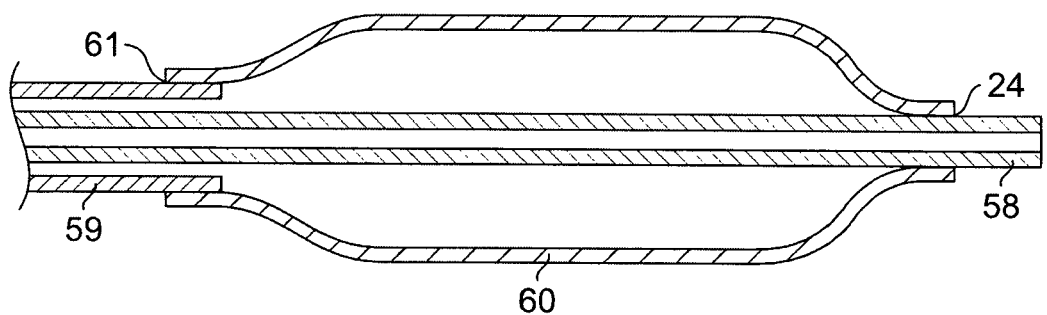
FIG. 7 is an illustration of a catheter and a dilatation balloon positioned to form a fusion bond site at a distal end thereof.

With reference to FIG. 5, yet another welding system 100 in accordance with the present invention is illustrated that is provided for fusing polymeric or nonpolymeric components. In addition, the welding system 100 may also be advantageously used to fuse polymeric and non-polymeric components together. For example, the welding system 100 may be used to fuse a polymeric component to a stainless steel component. In particular, the welding system 100 that is shown and will be described below is particularly designed for fusing plural polymeric catheter components together. As illustrated in FIG. 6, in one aspect of the present invention a first tubular catheter component 54 is positioned with respect to a second tubular catheter component 56 to be bonded together at facing ends thereof, thus creating a circumferentially-shaped fusion bond site 24. In another aspect of the present invention as illustrated in FIG. 7, a tubular catheter component 58 is positioned with respect to a balloon component 60 to be bonded together at a distal end thereof, thus creating a fusion bond site 24. A second bond site 61 is also created between the balloon component 60 and an outer tubular component 59. It is understood that the present invention may be utilized to create other fusion bond arrangements and geometries, such as lap welds, butt welds, seam welds, and the like as well as any other known or developed welding technique whereby components are located with at least portions thereof adjacent one another and thereby forming a fusion bond site in accordance with the present invention.

Similar to the systems 10 and 11 of FIGS. 1 and 2, the welding system 100 preferably has a laser 12 that provides a laser beam 14. The laser beam 14 is directed toward a beam expander 73 for increasing the diameter of the beam. Prior to reaching the beam expander 73, the laser beam 14 may be directed to a beam homogonizer 71 for enhancing the uniformity of the energy distribution across the diameter of the beam. The expanded laser beam 15 emanating from beam expander 73 is directed to beam shaping element 75. Beam shaping element 75 transforms the laser beam 15 into a ring or annular shaped beam 17 that is subsequently diverted by a mirror 36. The diverted portion of the annular shaped laser beam 39 is directed through a collimating lens 48 that refocuses the light along the path illustrated by dashed lines 51. The laser beam then impinges upon a mirror 52 that also functions as an infrared radiation collector as described below. The mirror 52 then directs the laser beam to the circumferentially-shaped fusion bond site 24. The mirror 52 may be a parabolic mirror having a focal length, for instance, of about 10 millimeters. As described above, a fusion zone 26 is formed by the impingement of the laser beam on the fusion bond site 24 thereby emitting thermal radiation (not shown). The emitted thermal radiation may then follow the reverse path of the laser beam such that it is directed through mirror 36 and generally along the path indicated by dashed line 66 to an optical chopper 62 as described below. The thermal radiation may then pass through the optical chopper 62 for improving the signal to noise ratio as described below and continue to the detector 30 by the path generally indicated by dashed line 68.

In addition to reflecting the laser beam onto the fusion bond site 24, the mirror 52 also functions as an infrared radiation collector to enhance detection of infrared radiation by the detector 30. Such a collector may comprise a lens, fiber-optic bundle, parabolic mirror, or other such optical device that gathers infrared emissions from an area larger than the emanating area and then projects such infrared radiation to the infrared detector 30 as described above. Moreover, parabolic or elliptic mirrors are able to capture radiation regardless of the emission angle of infrared radiation emanating from the weld bonding surfaces whereas a lens gathers radiation from only where the lens is directed.

An infrared collector is advantageously employed because infrared radiation is typically emitted in every direction from a hot surface or region, such as from the fusion zone 26 at a fusion bond site 24 comprising polymeric materials being welded in accordance with the present invention. For weld bonding polymeric catheter components, such weld bonding sites may have surface areas that are very small. Also, the temperatures associated with polymeric weld bonding processes are relatively low. As such, the use of an infrared collector is advantageous to get an accurate reading even where very little infrared radiation is emitted. That is, for the relatively low temperatures used for weld bonding polymeric materials and the relatively small heated areas, it is preferable to utilize an infrared collector to enhance the signal to noise ratio of the detected infrared radiation.

Further referring to FIG. 5, the infrared detector 30 is preferably used with the optical chopper 62 and a lock-in amplifier 64 in order to improve the signal to noise ratio of the measured radiation. Generally, the optical chopper 62 optically modulates the infrared radiation and the lock-in amplifier 64 amplifies the modulated radiation and filters out any radiation that has not been modulated at that particular chopping frequency. Preferably, the lock-in amplifier 64 has a signal based connection 70 to the optical chopper 62 and a signal based connection 72 to the detector 30. The optical chopper 62 generally provides a better signal to noise ratio of the thermal signal by using lock-in amplifier 64 as is conventionally known. That is, the thermal signal may be modulated at a predetermined frequency by the optical chopper 62. A reference signal from the optical chopper 62 enables the lock-in amplifier 64 to amplify the modulated signal. Other frequencies that may be received due to noise, such as extraneous thermal radiation from the surroundings, are not amplified. Hence, the signal of interest is amplified and the noise signal is not, thereby improving the signal to noise ratio of the thermal radiation signal.

Figure 8:
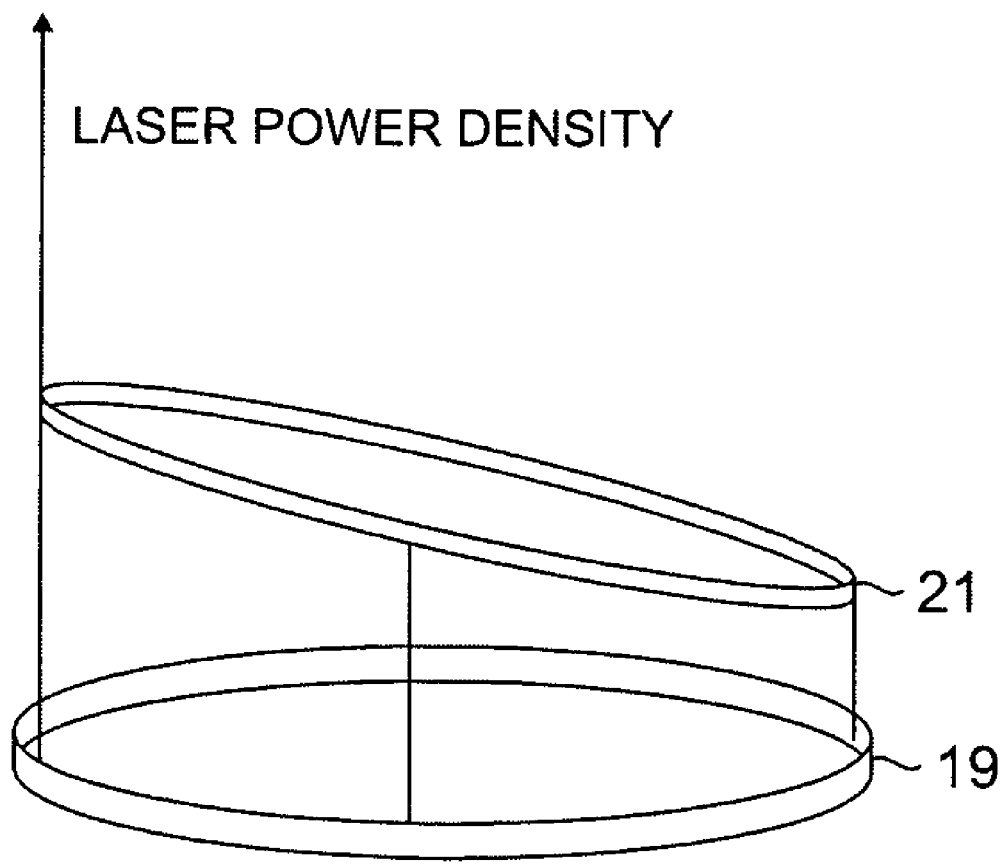
FIG. 8 is an illustration showing variations in intensity of an annular laser beam that is employed in the welding apparatus depicted in FIG. 5.

In accordance with the present invention and as also discussed above, the detector 30, which preferably comprises an infrared detector such as a dual split or a split quadrant infrared sensor, is positioned to receive the thermal radiation emitted from the fusion zone 26 as the polymeric components are heated and thereby fused. In this way the actual temperature of the materials, whether molten, softened or solid, at the fusion zone 26 can be determined by correlation to the detected thermal radiation. By sensing the infrared radiation in this manner, signal based information may be provided, which information can be advantageously used to controllably determine a desired intensity profile of annular shaped beam 17 and possibly the output power of the laser beam 14. In this embodiment of the invention the intensity profile of the annular shaped beam 17 refers to the intensity of the beam along its circumference. This arrangement, in which the intensity of beam along its circumference serves as the dynamic parameter that is controlled and adjusted by the beam shaping element 75, is depicted in FIG. 8. In FIG. 8 the vertical axis represents the intensity profile at any point along the annular shaped beam 17, which is represented as being physically located in the horizontal plane. Annular shaped beam 19 has a uniform intensity profile while annular shaped beam 21 has a nonuniformly-shaped intensity profile. Both beams 19 and 21 arise from the appropriate adjustment of the dynamically-adjustable beam shaping element 75.

Since the embodiment of the invention depicted in FIG. 5 employs only a single infrared detector 30, it is necessary to calibrate the detector 30 to determine from where in the fusion zone 26 the detected thermal radiation is emitted. If the infrared detector 30 is a CCD camera system, it is possible to establish a correlation between the outputs generated by a subset of pixels in the CCD camera and the location from which thermal radiation impinging upon that subset of pixels is emitted. This can be accomplished, for example, by adjusting the configuration of the beam shaping element 75 so that there is a non-zero intensity profile along only a small circumferential portion of the annular shaped beam 17 (e.g., one quadrant of the circumference) and then measuring the output from each pixel in the camera. By repeating this procedure for the entire circumference of the beam 17 (e.g., all four quadrants of the circumference), any given output pattern from the pixels or subset of pixels can be associated with a particular intensity profile along the circumference of the annular shaped beam 17.

The infrared radiation spectrum sensed by the detector or detectors in the various embodiments of the invention for providing control aspects to the bonding process. That is, the sensed radiation is preferably utilized for providing feedback to the laser in order to controllably adjust the intensity profile of the laser beam that is directed to the bond site. Further, it is specifically contemplated that the infrared radiation spectrum sensed by the detectors may be utilized for characterizing other aspects and features of the bonding process such as quality control or endpoint detection features. For example, the shape of the radiation spectrum sensed by the detectors and/or the corresponding laser control signal may be utilized to evaluate characteristics of the bonding process. It is understood that aspects of the bonding process such as voids, bubbles, delamination, inclusions and other weld defects, as well as quality aspects such as material identification (for example, identification of incorrect parts) may be characterized by the present invention.

The present invention is not limited to the above described preferred methods and apparatuses. For example, while the invention has been described in terms of methods and apparatuses for welding components, the invention is more generally applicable to methods and apparatuses for elevating the temperature of various materials for other purposes such as annealing and curing, for example. Furthermore, it should be understood that, while particular embodiments of the invention have been discussed, this invention is not limited thereto as modifications may be made by those skilled in the art, particularly in light of the foregoing teachings. Accordingly, the appended claims contemplate coverage of any such modifications as incorporate the essential features of these improvements within the true spirit and scope of the invention.

The invention claimed is:

1. A method for forming a fusion bond between two materials comprising the steps of:
   a. forming a bond site by positioning a portion of a first body with respect to a portion of a second body so that a fusion bond site is formed;
   b. providing a laser generating apparatus;
   c. providing a dynamically adjustable beam shaping element;
   d. generating a first laser beam having a symmetric intensity profile with the laser generating apparatus and passing the first laser beam through the beam shaping element to transform the first laser beam into a second laser beam having a width with an asymmetric intensity profile across its width; and
   e. directing the second laser beam onto at least a portion of the first and second bodies within the bond site so that a fusion zone having an increased temperature is formed therein.

2. The method of claim 1 wherein the intensity profile of the first laser beam is optically adjusted based on a predefined intensity profile sequence.

3. The method of claim 1 wherein the laser beam directing step includes the step of directing the second laser beam to the bond site to provide a controllable emissive power spectrum of the fusion zone, and further comprising the steps of:
- detecting the emissive power spectrum of infrared radiation being emitted from the fusion zone while directing the second laser beam onto the bond site; and
- converting the detected emissive power spectrum of infrared radiation into an analog or digital feedback signal, wherein the intensity profile of the second laser beam is optically adjusted based on the feedback signal to controllably obtain a desired emissive power spectrum of infrared radiation emitted from the fusion zone.

4. The method of claim 1 wherein at least one of the first and second bodies is a polymeric body.

5. The method of claim 1 wherein the first and second bodies are polymeric bodies.

6. The method of claim 1 wherein at least one of the first and second bodies is a metal body.

7. The method of claim 1 wherein the first and second bodies are metal bodies.

8. The method of claim 3 wherein the step of directing the second laser beam further comprises the step of optically adjusting a power level of the second laser beam based on the feedback signal to obtain the desired emissive power spectrum.

9. The method of claim 3 wherein the step of detecting the emissive power spectrum comprises the step of distinguishing between infrared radiation being emitted from the first body and infrared radiation being emitted from the second body.

10. The method of claim 3 wherein the converting step further comprises the step of associating the detected emissive power spectrum with a temperature of the fusion zone.

11. The method of claim 3 wherein the converting step further comprises the step of associating the detected emissive power spectrum from the first body with a first temperature of the first body in the fusion zone and associating the detected emissive power spectrum from the second body with a second temperature of the second body in the fusion zone.

12. The method of claim 4 wherein the first body of the forming step is a tubular catheter and the second body of the forming step is a polymeric dilatation balloon.

13. The method of claim 1, wherein the laser generating apparatus is a C02 laser that produces laser energy having a wavelength of about 10.6 microns.

14. The method of claim 1, wherein the second laser beam impinges on the bond site at an angle between about 45 degrees and about 90 degrees.

15. The method of claim 1, wherein the second laser beam impinges on the bond site at a substantially normal angle of incidence.

16. The method of claim 3, wherein the detecting step comprises detecting the emissive power spectrum of infrared radiation being emitted from the fusion zone by at least one radiation detecting device.

17. The method of claim 3, wherein the detecting step comprises detecting the emissive power spectrum of infrared radiation being emitted from the fusion zone by first and second radiation detecting devices each detecting infrared radiation from a different one of the bodies in the fusion zone.

18. The method of claim 16, wherein the radiation detecting device comprises a mercury-cadmium-telluride detector.

19. The method of claim 16, wherein the radiation detecting device comprises a dual split or split quadrant infrared sensor.

20. The method of claim 3, wherein the directing step further comprises directing the second laser beam to the bond site with a mirror.

21. The method of claim 20, wherein the directing step comprises directing the second laser beam such that the second laser beam impinges on the bond site at substantially normal angle of incidence.

22. The method of claim 20, wherein the directing step comprises directing the second laser beam such that the second laser beam such that the laser beam impinges on the bond site at an angle between about 45 degrees and about 90 degrees.

23. The method of claim 22, wherein the detecting step comprises detecting the emissive power spectrum with a detector positioned on axis with at least a portion of the second laser beam that is directed to the bond site.

24. The method of claim 22, wherein the mirror is a dichroic mirror.

25. The method of claim 3, wherein the adjusting step comprises operatively connecting a control system to a detector by a signal based connection and operatively connecting the control system to a dynamically-adjustable beam shaping element by a signal based connection.

26. The method of claim 25, further comprising providing an output signal from the control system for receipt by the dynamically-adjustable beam shaping element by using a process control algorithm for optically adjusting the intensity profile of the second laser beam in response to the electrical signal of the converting step.

27. The method of claim 26, wherein the process control algorithm is a PID control algorithm.

28. The method of claim 2, wherein the optically adjusting step further comprises refocusing the first laser beam to a predetermined shape, and directing the second laser beam to the bond site with first and second mirrors.

29. The method of claim 28, wherein the refocusing step is performed by a dynamically-adjustable beam shaping element.

30. The method of claim 2 wherein the step of optically adjusting the intensity profile of the first laser beam is performed by a dynamically-adjustable beam shaping element.

31. The method of claim 29 wherein the step of optically adjusting the intensity profile of the first laser beam is performed by the dynamically-adjustable beam shaping element.

32. The method of claim 28, wherein the first mirror is a dichroic mirror and the second mirror is a parabolic mirror.

33. The method of claim 32, further comprising improving the signal to noise ratio of the detected infrared radiation by optically modulating and amplifying the infrared radiation and filtering out the radiation which is not modulated.

34. The method of claim 1, wherein the forming step comprises forming the bond site by positioning a portion of a first tubular catheter component with respect to a portion of a second tubular catheter component so that a substantially circular fusion bond site is formed.

35. The method of claim 1, wherein the forming step comprises forming the bond site by positioning a portion of a tubular catheter component with respect to portion of a dilatation balloon so that a substantially circular fusion bond site is formed.

36. The method of claim 3 wherein the intensity profile of the first laser beam is optically adjusted by diffraction of the first laser beam.

37. The method of claim 1, wherein in step (d) a first amount of laser energy is directed onto the first body and a second amount of laser energy is directed onto the second body, and in step (d) a ratio of the first and second amounts of laser energy is varied.

38. The method of claim 1, further comprising the step of subsequent to step (d), optically varying the intensity profile of the second laser beam while it is being directed onto the bond site to produce a laser beam of the width.

39. The method of claim 1, wherein the second laser beam has a first portion extending to a first end and a second portion extending to a second end opposite the first end, the first portion extending for 30% of the width of the second laser beam and the second portion extending for 30% of the width of the second laser beam, wherein the intensity profile of the first portion is greater than the intensity profile in the second portion.

40. The method of claim 39, wherein the energy of the second laser beam in the first portion is greater than the energy of the second laser beam in the second portion.

41. The method of claim 39, wherein the first end is a front end and further comprising the step of moving the second laser beam in the direction of the front end.

42. The method of claim 1, wherein the second laser beam has a first asymmetric energy profile that extends across a width and a second asymmetric energy profile that extends across the width.

43. A method for forming a fusion bond between two materials comprising the steps of:
  a. forming a bond site by positioning a portion of a first body with respect to a portion of a second body so that a fusion bond site is formed;
  b. providing a laser generating apparatus;
  c. providing a dynamically adjustable beam shaping element;
  d. generating a first laser beam having a Gaussian intensity profile with the laser generating apparatus and passing the first laser beam through the beam shaping element to transform the first laser beam into a second laser beam having a width with an asymmetric intensity profile across its width; and
  e. directing the laser beam onto at least a first portion of the first body within the bond site and a second portion of the second body within the bond site so that a fusion zone having an increased temperature is formed; and
  f. subsequent to step (d), delivering different amounts of optical energy to each of the first and second body portions within the bond site by optically adjusting the intensity profile of the beam while the beam is being directed onto the bond site so that different beam intensities impinge on each of the first and second body portions.

44. The method of claim 43 further comprising selecting the different amounts of optical energy delivered to each of the first and second body portions in order to achieve a desired condition.

45. The method of claim 44 wherein the desired condition is a desired emissive power spectrum of infrared radiation being emitted from each of the first and second body portions within the bond site.

46. The method of claim 44 wherein the desired condition includes a first target temperature for the first body portion within the bond site and a second target temperature for the second body portion within the bond site.

47. The method of claim 43 wherein in step (e) a ratio of the amounts of optical energy delivered to each of the first and second body portions differs from a ratio of the amounts of optical energy delivered to each of the first and second body portions in step (d).

48. The method of claim 43, wherein the second laser beam has a first portion extending to a first end and a second portion extending to a second end opposite the first end, the first portion extending for 30% of the width of the second laser beam and the second portion extending for 30% of the width of the second laser beam, wherein the intensity profile of the first portion is greater than the intensity profile in the second portion.

49. The method of claim 48, wherein the energy of the second laser beam in the first portion is greater than the energy of the second laser beam in the second portion.

50. The method of claim 48, wherein the first end is a front end and further comprising the step of moving the second laser beam in the direction of the front end.

* * * * *